United States Patent [19]

Tsuchino et al.

[11] Patent Number: 5,055,681

[45] Date of Patent: * Oct. 8, 1991

[54] RADIOGRAPHIC IMAGE STORAGE PANEL AND PROCESS FOR READING OUT A RADIOGRAPHIC IMAGE

[75] Inventors: Hisanori Tsuchino; Akiko Kano; Koji Amitani; Fumio Shimada, all of Hino, Japan

[73] Assignee: Konica Corporation, Tokyo, Japan

[*] Notice: The portion of the term of this patent subsequent to Sep. 6, 2005 has been disclaimed.

[21] Appl. No.: 513,021

[22] Filed: Apr. 23, 1990

Related U.S. Application Data

[63] Continuation of Ser. No. 839,059, Mar. 13, 1986, abandoned, and a continuation-in-part of Ser. No. 774,321, Sep. 10, 1985, abandoned.

[30] Foreign Application Priority Data

Sep. 18, 1984 [JP] Japan .................................. 59-196365
Mar. 15, 1985 [JP] Japan .................................. 60-53168

[51] Int. Cl.$^5$ ............................................. G01N 23/04
[52] U.S. Cl. .................................. 250/327.2; 250/484.1
[58] Field of Search ........................ 250/327.2, 484.1

[56] References Cited

U.S. PATENT DOCUMENTS

| Re. 31,847 | 3/1985 | Luckey | 250/327.2 |
| 2,756,343 | 7/1956 | Johnson | 250/337 |
| 4,236,077 | 11/1980 | Sonoda et al. | 250/486.1 |
| 4,517,463 | 5/1985 | Gasiot et al. | 250/327.2 |
| 4,554,454 | 11/1985 | Taniguchi | 250/327.2 |
| 4,752,557 | 6/1988 | Tsuchino et al. | 250/484.1 B |
| 4,769,549 | 9/1988 | Tsuchino et al. | 250/486.1 |

FOREIGN PATENT DOCUMENTS

165642 8/1985 Japan ................................ 250/484.1

Primary Examiner—Carolyn E. Fields
Attorney, Agent, or Firm—Jordan B. Bierman

[57] ABSTRACT

A method for reading a radiographic image by irradiating an image storage panel having a layer formed by vacuum evaporation and containing a stimulable alkali halide binderless phosphor. The irradiation takes place with an excitation ray at an oblique angle to a line normal to the panel and the phosphor comprises a pile-like structure. The method produces sharper images and improved sensitivity.

5 Claims, 6 Drawing Sheets

RADIOGRAPHIC IMAGE STORAGE PANEL AND PROCESS FOR READING OUT A RADIOGRAPHIC IMAGE

This application is a continuation of application Ser. No. 839,059, filed Mar. 13, 1986, now abandoned, and a continuation-in-part of application Ser. No. 774,321, filed Sept. 10, 1985, now abandoned.

BACKGROUND OF THE INVENTION

This invention relates to a radiographic image storage panel and a process for reading out a radiographic image information stored in the storage panel, and especially to a radiographic image storage panel and a process for reading out a radiographic image information stored in the storage panel which provides a radiographic image having a high sharpness.

Such a radiographic image as an X-ray image has been widely used for diagnosis of diseases and the like. For the purpose of obtaining such an X-ray image, an X-ray radiophotography wherein a phosphor layer (a fluorescent screen) is irradiated with X-rays which are transmitted by a subject to have visible rays produced, and a silver salt-coated photographic film is irradiated with the produced visible rays and then developed as in the common photographic way, is applied. In recent years, however, methods to take out a photographic image directly from the fluorescent screen without using a silver salt-coated film have come to be developed.

As such a method, there is cited, for example, a method wherein first, radioactive rays which are transmitted by a subject are made absorbed by a fluorescent screen, then said screen is made excited by light or thermal energy or the like so that said screen may emit as fluorescence radiation energy which is absorbed and accumulated thereby, and then said emitted fluorescence is detected to make an image. For example, methods of radiographic image storage to use a stimulable phosphor and to use visible or infrared rays as stimulable excitation rays have been proposed by U.S. Pat. No. 3,859,527 and Japanese Patent O.P.I. Publication No. 12144/1980. In a radiographic image storage of these methods, the layer containing a stimulable phosphor is formed on a support. This layer is irradiated with radioactive rays which are transmitted by the subject to accumulate radiation energy in accordance with transmission rate of every site of the subject so as to build a latent image, and then scanned with stimulable excitation rays to make accumulated radiation energy emit site by site. The emitted radiation energy is converted to light, and then the image is made according to optical signals based on variation of intensity of the light. This final image is allowed either to be regenerated as a hard copy, or to be regenerated on CRT.

As for the radiographic image storage panel, which has a layer containing a stimulable phosphor, of these methods, it is required that not only both the absorption rate of radiation and conversion rate to light (hereinafter both together are referred to as a whole "radiosensitivity") are high, but also the final image is good in graininess and sharpness, similarly to the case of aforementioned radiography using fluorescent screen.

Figure 3:
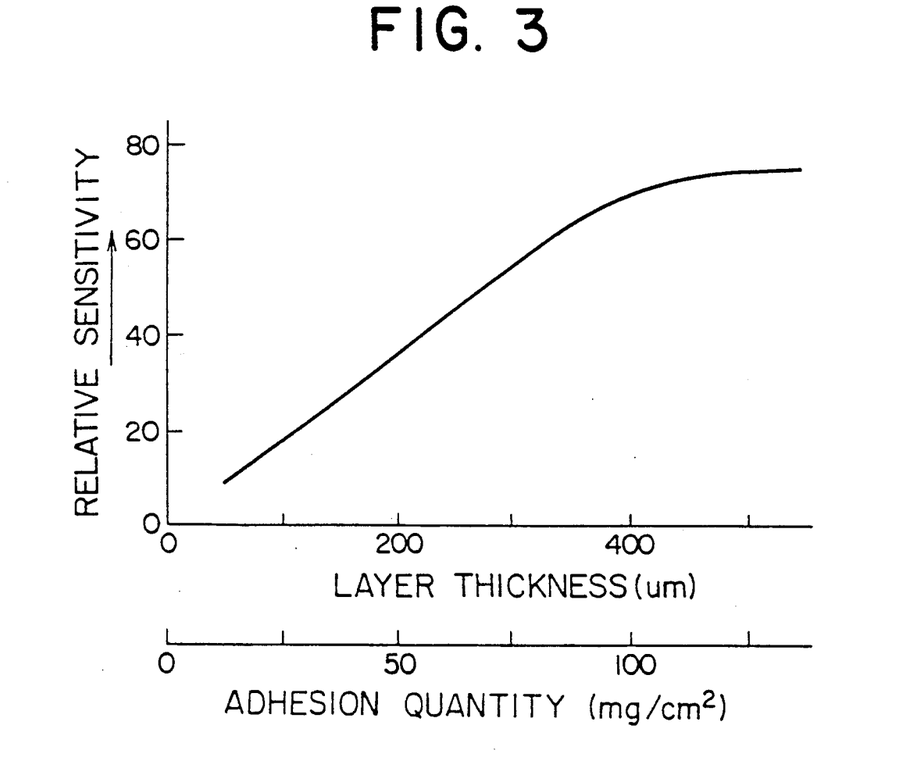
FIG. 3 illustrates the relation between the layer thickness or the quantity adhered and the relative radiosensitivity in the conventional radiographic image storage panel.

However, since such a radiographic image storage panel, which has a layer containing a stimulable phosphor, is in general prepared by coating a dispersion which contains both stimulable phosphor particles with particle sizes ranging from 1 $\mu$m to 30 $\mu$m or so, and some organic binder, on its support or protective layer, the packing density of the stimulable phosphor is necessarily low as 50% for packing ratio, and consequently requires the layer containing the stimulable phosphor to be much thick to secure a sufficiently high radiosensitivity as shown in FIG. 3. While the quantity of the adhered stimulable phosphor is about 50 mg/cm$^2$ when the thickness of the layer is about 200 $\mu$m, the radiosensitivity linearly rises until the thickness reaches about 350 $\mu$m, but levels off over about 450 $\mu$m of thickness. Such a leveling-off of the radiosensitivity is caused by missing the emission of the stimulable fluorescence from the inside of the layer containing the stimulable phosphor due to the dispersing of the stimulable fluorescence among stimulable phosphor particles.

Figure 4:
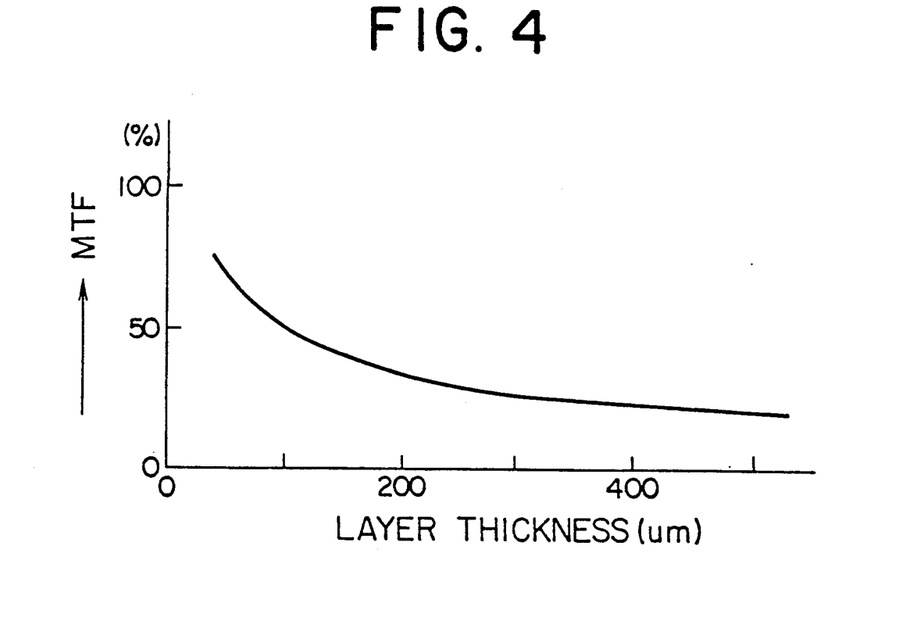
FIG. 4 illustrates the relation between the layer thickness and the modulation transfer function (MTF) at 2 cycles/mm of spatial frequency in the conventional radiographic image storage panel.

On the other hand, in the above radiographic image storage methods, the thicker the layer containing the stimulable phosphor is, the sharper the obtained image tends to be as shown in FIG. 4; therefore, it is necessary to make said layer thinner as possible for the requirement of improving the image sharpness.

In addition, since the image graininess according to the above radiographic image storage methods definitely depends on the locational fluctuations of number of radiation quantums (quantum mottles), and/or structural disturbances of the layer containing the stimulable phosphor of the radiographic image storage panel (structure mottles, the thinning of said layer causes the increase in quantum mottles through the decrease in number of radioactive quantums absorbed in said layer, and/or the decrease in structure mottles through the actualization of structural disturbances, resulting in the deterioration of the image quality. Therefore, it is necessary to make said layer thicker as possible for the requirement of improving of the image graininess.

Thus, so far as the thickness of the layer containing a stimulable phosphor in such a conventional radiographic image storage panel, both the radiosensitivity or graininess of the resulting image, and the sharpness of the image present quite opposite requirements; therefore said panel has been made necessarily at some compromise between different requirements of both the radiosensitivity or graininess, and the sharpness.

Whereas, as well known, the image sharpness in the conventional radiography depends on the diffusion of the instantaneous fluorescence (the fluorescence on irradiating) by the phosphor in the fluorescent screen, the image sharpness in the above radiographic image storage method using the stimulable phosphor does not depend on the diffusion of the stimulable fluorescence by the stimulable phosphor in the radiographic image storage panel, but depends on the extension of the stimulable excitation rays in said panel. The reason for this is as follows. That is, since, in such a radiographic image storage method, the radiographic image information accumulated in the panel is taken out thereof on a time series basis, the stimulable fluorescence by the stimulable excitation rays irradiated at a certain time ($t_i$) is desirably recorded as the output from a certain pixel ($x_i$, $y_i$) on said panel which is irradiated with said stimulable excitation rays at that time ($t_i$). If said stimulable excitation rays had extended in said panel due to dispersing or the like, and excited even stimulable phospor particles outside the pixel ($x_i$, $y_i$) actually irradiated, besides, the output from the area wider than said pixel ($x_i$, $y_i$) would be recorded as the output from said pixel. Therefore, if the stimulable fluorescence by the stimulable excitation rays irradiated at the time ($t_i$) is the only fluorescence from said pixel ($x_i$, $y_i$) on the panel truly irradiated by said stimulable excitation rays at that time ($t_i$), the sharpness of the obtained image is regardless of the diffusion of said fluorescence.

Under such situations some methods to improve the sharpness of the radiographic image have been proposed, including: a method of incorporating certain white powder into a layer containing a stimulable phosphor of a radiographic image storage panel by Japanese Patent O.P.I. Publication No. 146447/1980; and a method of coloring a radiographic image storage panel so that the mean reflecting rate of rays of the stimulable excitation wavelength region by the stimulable phosphor may be lower than that of rays of the stimulable fluorescent wavelength region by Japanese Patent O.P.I. Publication No. 163500/1980, for example. These methods however bring about the reduction of sensitivity inevitably in exchange of the improvement of image sharpness, and so are not evaluated as desirable.

SUMMARY OF THE INVENTION

Object of the Invention

The invention is presented with considerations of the above drawbacks and contradictions in the prior arts of radiographic image storage panel using some stimulable phosphor. The first object of the invention is to provide a radiographic image storage panel having an improved radiosensitivity and giving a highly sharp image.

The second object of the invention is to provide a radiographic image storage panel giving an image high in sharpness as well as in graininess.

The third object of the invention is to provide a process for preparing such a radiographic image storage panel as above.

The fourth object of the invention is to provide a process for reading out information stored in such a radiographic image storage panel as above.

Constitution of the Invention

In a radiographic image storage panel having at least one layer containing a stimulable phosphor, the above objects of the invention are attained by a radiographic image storage panel which is characterized by that said layer containing a stimulable phosphor has a stimulable phosphor layer part without binder; a radiographic image storage panel which is characterized by that said stimulable phosphor layer part without binder is formed in said layer containing a stimulable phosphor; and, in addition, a process for preparing said radiographic image storage panel.

The above-mentioned objects of the invention can be accomplished by a process for reading out a radiographic image information, wherein a radiographic latent image stored in the panel can be read out by detecting the stimulated fluorescence emitted from the panel when the panel is exposed to and scanned with a stimulating excitation light beam; the process is so arranged as to irradiate the panel with the stimulable excitation light beam at a given incident angle to the normal line direction of the panel and to locate the condensing plane of the stimulated fluorescence at a substantially right angle to the normal line direction of the panel.

As a practical mode of the process for preparing the radiographic image storage panel of the invention, it is preferable that vacuum evaporation is applied for the formation of said stimulable phosphor layer part without binder in said layer containing a stimulable phosphor.

When some vacuum evaporation or sputtering technique is applied, it may be possible that the stimulable phosphor penetrates into such a layer with binder as the support, its undercoating layer or the protective layer, or that the binder in the undercoating or protective layer intrudes into the layer containing a stimulable phosphor. However, since possible mixed layers produced by such permeation or intrusion action as above are considered as negligible from the practical viewpoint, the description is given hereinafter regarding such mixed layers as nonproduced.

As mentioned above, according to the invention, the packing density ratio and the sensitivity to X-rays of the layer containing a stimulable phosphor are improved because of the absence of binder therein. The absence of binder causes also the directivity of the layer containing a stimulable phosphor to improve, resulting in both the improvement of sensitivity through the detectability of stimulable fluorescence from the inside of the layer containing a stimulable phosphor, and the improvement of the image sharpness through the reduction of diffusion of the stimulable exciting emission.

Furthermore, the absence of binder in the layer containing a stimulable phosphor of the invention causes the packing density ratio of the stimulable phosphor to improve, resulting in the improving of image graininess through the reduction of both quantum mottles by radioactive rays, and structural mottles of the layer containing a stimulable phosphor.

Thus, the invention has very great effects, and so is industrially useful.

DETAILED DESCRIPTION OF THE INVENTION

Detailed description of the invention is given as follows:

In the radiographic image storage panel of the invention, said stimulable phosphor is referred to the phosphor which, after the initial irradiation of light or high-energy radioactive rays, emits the stimulable luminescence corresponding to the dose of the initial irradiation of light or high-energy, radioactive rays, being induced by some optical, thermal, mechanical, chemical or electrical stimulation (that is, stimulable excitation), and, preferably from the practical viewpoint, is the phosphor which does so induced by stimulable excitation rays with 500 nm or longer wavelength. As a stimulable phosphor used in the radiophotographic image storage panel of the invention, each of the following phosphors is useful for example:

phosphors represented by $BaSO_4:A_x$ (where a is at least one element among y, Tb and Tm, and x satisfies $0.001 \leq x \leq 1$ mol %) and described in Japanese Patent O.P.I. Publication No. 80487/1973;

phosphors represented by $MgSO_4$ :Ax (where A is either Ho or Dy, and x satisfies $0.001 \leq x \leq 1$ mol %), and described in Japanese Patent O.P.I. Publication No. 80488/1973; phosphors represented by $SrSO_4$:Ax (where A is at least one element among Dy, Tb and Tm, and x satisfies $0.001 \leq x < 1$ mol %); and described in Japanese Patent O.P.I. Publication No. 80489/1973;

phosphors composed of $Na_2$, $SO_4$, $CaSO_4$ containing at least one element among Mn, Dy and Tb, and described in Japanese Patent O.P.I. Publication No. 29889/1976; phosphors composed of BeO, LiF, $MgSO_4$ or $CaF_2$ and described in Japanese Patent O.P.I. Publication No. 30487/1977; phosphors composed of $Li_2B_4O_7$:Cu or Ag, and described in Japanese Patent O.P.I. Application No. 39277/1978;

phosphors represented by either $Li_2O.(B_2O_2)x$:Cu (where x satisfies $2 < x \leq 3$), or $Li_2O (B_2O_2) x$ : Cu, A (where x satisfies $2 < x \leq 3$ again), and described in Japanese Patent O.P.I. Publication No. 47883/1979;

phosphors represented by SrS:Ce, Sm; SrS:Eu, Sm; $La_2O_2s$: Eu, Sm; and (Zn, Cd) S:

Mn, X- (Where X is halogen), and described in U.S. Pat. No. 3,859,527;

phosphors represented by ZnS : Cu or Pb, barium aluminate phosphors represented by $BaO.xAl_2O_3$: Eu (where x satisfies $0.8 \leq x \leq 10$) and alkali earth silicate phosphors represented by $M^{II}O. x SiO_2$: A (where $M^{II}$ is Mg, Ca, Sr, Zn, Cd or Ba; A is at least one element among Ce, Tb, Eu, Tm, Pb, Tl, Bi and Mn; and x satisfies $0.5 \leq x < 2.5$) of Japanese Patent O.P.I. Publication No. 12142/1980;

alkali earth fluorohalide phosphors represented by $(Ba_{1-x-y} Mg_xCa_y)$ $FX$:$eEu^{2+}$ (where X is at least one of Br and Cl; and x, y and e satisfy $0 < x+y \leq 0.6$, $xy \neq 0$, and $10^{-6} \leq e \leq 5 \times 10^{-2}$, respectively); phosphors represented by Ln OX: xA (where Ln is at least one element among La, Y, Gd and Lu; X is Cl and/or Br; A is Ce and/or Tb; and x satisfies $0 < x < 0.1$), and described in Japanese Patent O.P.I. Publication No. 12144/1980; phosphors represented by $(Ba_{1-x}M''x)$ FX:yA (where $M^{II}$ is at least one element among Mg, Ca, Sr, Zn and Cd; X is at least one among Cl, Br and I; A is at least one element among Eu, Tb, Ce, Tm, Dy, Pr, Ho, Nd, Yb and Er; x and y satisfy $0 \leq x \leq 0.6$ and $0 \leq y \leq 0.2$, respectively), and described in Japanese Patent O.P.I. Publication No. 12145/1980; phosphors represented by B FX: xCe, yA (where X is at least one element among Cl, Br and I; A is at least one element among In, Tl, Gd, Sm and Zr; x and y satisfy $0 < x \leq 2 \times 10^{-1}$ and $0 < y \leq 5 \times 10^{31}$ $^2$, respectively), and described in Japanese Patent O.P.I. Publication No. 84389/1980, rare-earth element-activated divalent metal fluorohalide phosphors represented by $M^{II}FX.'xA$: yLn (where $M^{II}$ is at least one element among Mg, Ca, Ba, Sr, Zn and Cd; A is at least one oxide among BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element among Eu, Tb, Ce, Tm, Dy, Pr, Ho, Nd, Yb, Ev, Sm and Gd; X is at least one element among Cl, Br and I; x and y satisfy $5 \times 10^{-5} \leq x \leq 0.5$ and $0 < y \leq 0.2$, respectively), and described in Japanese Patent O.P.I. Publication No. 160078/1980; and phosphors represented by either x $M_3 (PO_4)_2$. $NX_2$: yA or $M_3 (PO_4)_2$. yA (where each of M and N is at least on element among Mg, Ca, Sr, Ba, Zn and Cd; X is at least one element among F, Cl, Br and I; A is at least one element along Eu, Tb, Ce, Tm, Dy, Pr, Ho, Nd, Er, Sb, Tl, Mn and Sn; and x and y satisfy $0 < x \leq 6$ and $0 \leq y \leq 1$, respectively); phosphors represented by either $nReX_3$. $mAX'_2$: xEu or $nReX_3$. $mASX'_2$: xEu, ySm (where Re is at least one element among La, Gd, Y and Lu; A is at least one element among Ba, Sr and Ca; each of x and X' is at least one element among F, Cl and Br; x and y satisfy $1 \times 10^{-4} < x < 3 \times 10^{-1}$ and $1 \times 10^{-4} < y < 1 \times 10^{-1}$, respectively; and n/m satisfies $1 \times 10^{-3} < n/m < 7 \times 10^{-1}$); alkaline halide phosphors represented by $M^IX.aM^{II}X_2^3.bM^{III} x_3 - cA$ (where $M^I$ is at least one alkaline metal selected from among LI, Ma, K, b and Cs; $M^{II}$ is at least one divalent metal selected from among, Be, Mg, Ca, Sr, Ba, Zn, Cd, Cu and Ni; $M^{III}$ is at least one trivalent metal selected from among Sc, Y, La, Ce, Pr, Nd, Pm, Sm, Eu, Gd, Tb, Dy, Ho, Er, Tm, Yb, Lu, Al, Ga and In; each of X, X' and X" is at least one halogen selected from among F, Cl, Br and I; A is at least one metal selected from Eu, Tb, Ce, Tm, Dy, Pr, Ho, Nd, Yb, Er, Gd, Lu, Sm, Y Tl, Na, Ag, Cu and Mg; and the values a, b and c satisfy $0 \leq a < 0.05$, $0 \leq b < 0.5$ and $0 < C \leq 0.2$ respectively) of Japanese Patent O.P.I. Publication No. 148285/1982.

Among these types of phosphors, alkali halide phosphors are especially preferable because their easy formability of layer containing a stimulable phosphor by means of vacuum evaporation, sputtering or the like.

However, the stimulable phosphors used in the radiographic image storage panel of the invention are not limited to above-mentioned phosphors, but include any phosphor if it can exhibit stimulable luminescence on irradiation with stimulable excitation rays after the radiation of radioactive rays.

Said stimulable phosphor is lamellarly deposited without binder on a support to form a layer containing the stimulable phosphor, resulting in the formation of the radiographic image storage panel of the invention.

The radiographic image storage panel of the invention is also allowed to be a group of stimulable phosphor layers which are composed of two or more stimulable phosphor layers containing at least one among above-mentioned stimulable phosphors. Stimulable phosphor which are contained by respective stimulable phosphor layers are allowed to be the same of different from each other.

The manufacturing methods of the radiographic image storage panels of the invention whose stimulable phosphor layers contain no binder are described as follows:

The first method is vacuum evaporation. In this process, first a vacuum evaporating apparatus in which a support has been placed is evacuated to a level of $10^{-6}$ Torr or so. Then, at least one stimulable phosphor afore-mentioned is vaporized by means of resistive heating, electron beam heating or the like to have a layer of said phosphor with a desired thickness formed on the surface of said support, resulting in the formation of a layer containing said stimulable phosphor without binder.

In this vacuum evaporating method, it is also allowed to have said layer containing a stimulable phosphor formed by repeating plural number of vaporizing procedures, In addition, it is also allowed to conduct co-vacuum evaporation using plural number of resistive heaters or electron beams.

After the vacuum evaporating operation, the layer containing stimulable phosphor is provided with a protective layer on its side opposite to said support if necessary, to complete the radiographic image storage panel of the invention. Alternatively, it is allowed to have the layer containing a stimulable phosphor formed on a protective layer first, and then to provide it with a support.

In this vacuum evaporating method, it is also possible to have stimulable phosphors, raw materials co-vaporized using plural number of resistive heaters or electron beams in order to synthesize the intended stimulable phospor on a support, an to have the layer containing a stimulable phosphor formed concurrently.

In this vacuum evaporating method, it is also allowed to cool or heat the layer to be deposited onto, said support or protective layer, during vaporizing if necessary, or to heat-treat the deposited layer after vaporizing.

The second method is sputtering technique. In this process, first a sputtering apparatus in which support has been placed is evacuated to a level of $10^{-6}$ Torr or so, then such an inert gas as Ar or Ne is introduced into said apparatus to raise the inner pressure up to a level of $10^{-3}$ Torr or so. And then at least one stimulable phosphor afore-mentioned as target is sputtered to have a layer of said phosphor with a desired thickness deposited on the surface of said support.

In this sputtering method, it is also allowed to have said layer containing a stimulable phosphor formed by repeating plural number of sputtering procedures. It is also allowed to have layer containing a stimulable phosphor formed by sputtering, concurrently or in order, plural number of targets comprising different stimulable phosphors respectively.

After the sputtering operation, the layer containing a stimulable phosphor is provided with a protective layer on its side opposite to said support if necessary, to complete the radiographic image panel of the invention. Alternatively, it is allowed to have the layer containing a stimulable phosphor formed on a protective layer first, and then to provide it with a support.

In this sputtering method, it is also possible to employ plural number of stimulable phosphor's raw materials as targets, and to sputter them concurrently or in order to synthesize the intended stimulable phosphor on the support, and to have a layer containing the stimulable phosphors formed concurrently. In this sputtering method, it is also allowed to apply a reactive sputtering technique if necessary by introducing such a gas as $O_2$ or $H_2$ into the apparatus. Furthermore, it is allowed to cool or heat the layer to be deposited onto, said support or protective layer, during sputtering if necessary. It is also allowed to heat-treat the deposited layer after sputtering.

The third method is chemical vapor deposition (CVD). In this method, the layer containing a stimulable phosphor without binder is obtained on the support by decomposing the intended stimulable phosphor or organometallic compound containing the raw material of said phosphor using thermal energy, high-frequency power and the like.

The fourth method is spraying technique. In this method, the layer containing a stimulable phosphor without binder is obtained by spraying stimulable phosphor powder onto a tacky layer of the support.

The fifth method is baking method. In this method, an organic binder containing stimulable phosphor powder dispersed therein is coated on a support which is then baked and thereby the organic binder is volatilized, and thus a stimulable phosphor layer without binder is obtained.

The thickness of the layer containing a stimulable phosphor of the radiographic image storage panel of the invention is varied according to the radiosensitivity of the intended radiographic image storage panel, and the type of the stimulable phosphor, but is preferably selected from a range from 30 $\mu$m to 1000 $\mu$m, especially from 50 $\mu$m to 800 $\mu$m.

In this invention, it is preferable that the uppermost stimulable phosphor layer is a layer without binder in the case that the panel has multi-stimulable layer.

When the thickness of the stimulable phosphor layer is less than 30 $\mu$m, the radiation absorptance thereof deteriorates extremely, and thereby, the radiation sensitivity is lowered and the graininess of an image therefrom is deteriorated. In addition to the foregoing, the stimulable phosphor layer is caused to be transparent, and thereby, the two dimensional spreading of stimulable excitation rays in the stimulable phosphor layer is extremely increased, which results in the tendency wherein an image sharpness is deteriorated.

Figure 1:
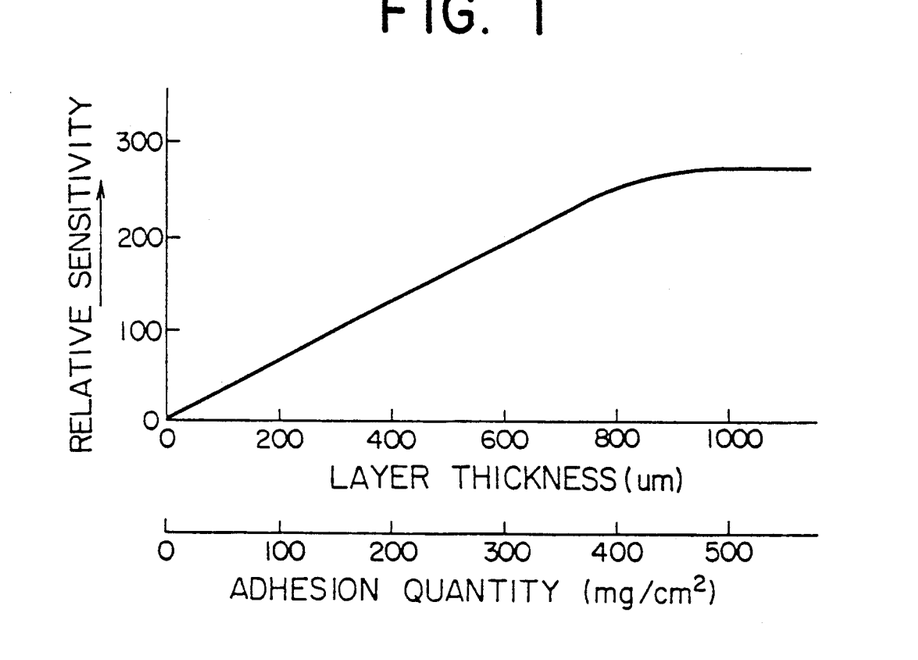
FIG. 1 illustrates the relation between the layer thickness or the quantity adhered and the relative radiosensitivity in the radiographic image storage panel of the invention.

FIG. 1 illustrates the relation between the thickness (or the corresponding quantity adhered), and the radio-sensitivity of the stimulable phosphor in the radiographic image storage panel of the invention. Since the layer containing a stimulable phosphor of the radiographic image storage panel of the invention does not contain any binder, its quantity adhered of stimulable phosphor (or its packing ratio) amounts to about 2 times comparing to that of the conventional radiographic image storage panel, as definitely seen in comparison with FIGS. 3 and 4. Therefore, according to the invention, the improvement of the absorption rate of radiation per unit thickness of layer containing a stimulable phosphor not only produces a radiosensitivity much higher compared to the conventional radiographic image storage panel, but also causes a certain improvement of the graininess of image.

In addition, since the layer of a stimulable phosphor of the radiographic image storage panel of the invention does not contain any binder, it has the high directivity of stimulable excitation rays and stimulable luminescence comparing to the conventional radiographic image storage panel, making it permissive to thicken said panel.

Furthermore, since the layer containing a stimulable phosphor of the radiographic image storage panel of the invention has a good directivity, it causes the dispersion of stimulable excitation rays in the layer containing a stimulus phosphor to reduce, resulting in a remarkable improvement of image sharpness.

As a support used in the radiographic image storage panel of the invention, various polymer materials, glass, tempered glass, metals and the like are used. Among them, flexible or easily roll-processable sheet materials are especially suitable in view of the handling of information recording material. From this point of view, the especially preferable material of support is, for example, such plastic film as cellulose acetate, polyester, polyethylene terephthalate, polyamide, polyimide, cellulose triacetate or polycarbonate film, or such metallic sheet as aluminum, steel or copper sheet.

Figure 2A:
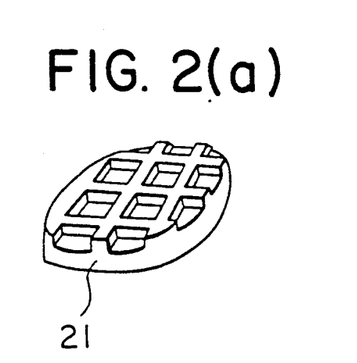
FIGS. 2(a) and (b) show samples of support used in the invention.
Figure 2B:
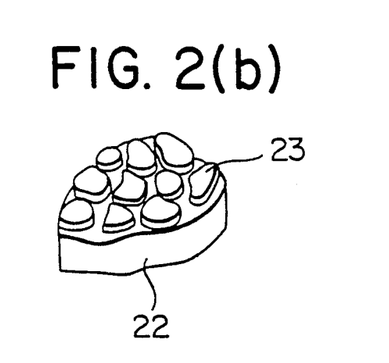
Figure 2C:
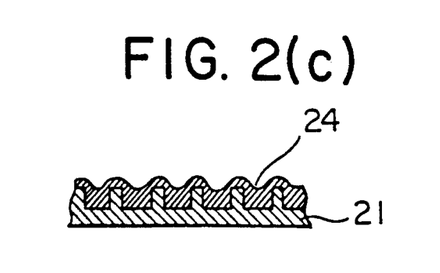
FIGS. 2(c) and (d) show samples of sectional containing a stimulable phosphor is provided onto said support.
Figure 2D:
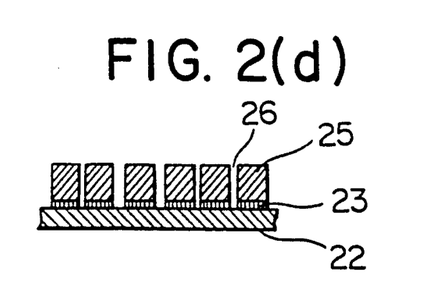

The surface of such a support is allowed to be not only flat but also matt for the purpose of improvement of its adhesiveness to the layer containing a stimulable phosphor. Furthermore, a matting method is allowed to be either a method for making a rugged surface as shown in FIG. 2(a) or a method for the structure with separately spread small tile-like plates as shown in FIG. 2(b), in addition to a method wherein a matting agent is used. Such an uneven surface as shown in FIG. 2(a) further improves the image sharpness, because the layer containing a stimulable phosphor thereon is finely divided by its unevenness as shown FIG. 2(c). Such an irregular surface as shown in FIG. 2(b) also further improves the image sharpness, because the layer containing a stimulable phosphor is deposited thereon sustaining substantially the irregularity of the surface of the support, and because, consequently, the layer containing a stimulable phosphor is composed of a number of small pile-like blocks separated each another by cracks as shown in FIG. 2(d).

In addition, the support of the invention is allowed to be preliminarily provided with an undercoating layer on its interface with the layer containing a stimulable phosphor for the purpose of improving its adhesiveness to said layer. The thickness of the support is selected according to the nature of its material, but generally ranges from 100 $\mu$m to 1500 $\mu$m, and further preferable from 100 $\mu$m to 1000 $\mu$m in the handling viewpoint.

In the radiographic image storage panel of the invention, it is generally allowed that the layer containing a stimulable phosphor is provided with a protective layer on its side opposite to said support for the purpose of protecting said layer containing a stimulable phosphor physically or chemically. Such a protected layer is provided by coating its applying liquid directly on said layer containing a stimulable phosphor, or by making separately and sticking itself thereon. As the material for the protective layer, there are used such usual protective material as cellulose acetate, nitrocellulose, polymethyl methacrylate, polyvinyl butyral, polyvinyl formal, polycarbonate, polyester, polyethylene terephthalate, polyethylene, polyvinylidene chloride and nylon. Usually the thickness of the protective layer is preferably 1 $\mu$m to 40 $\mu$m or so.

Figure 5:
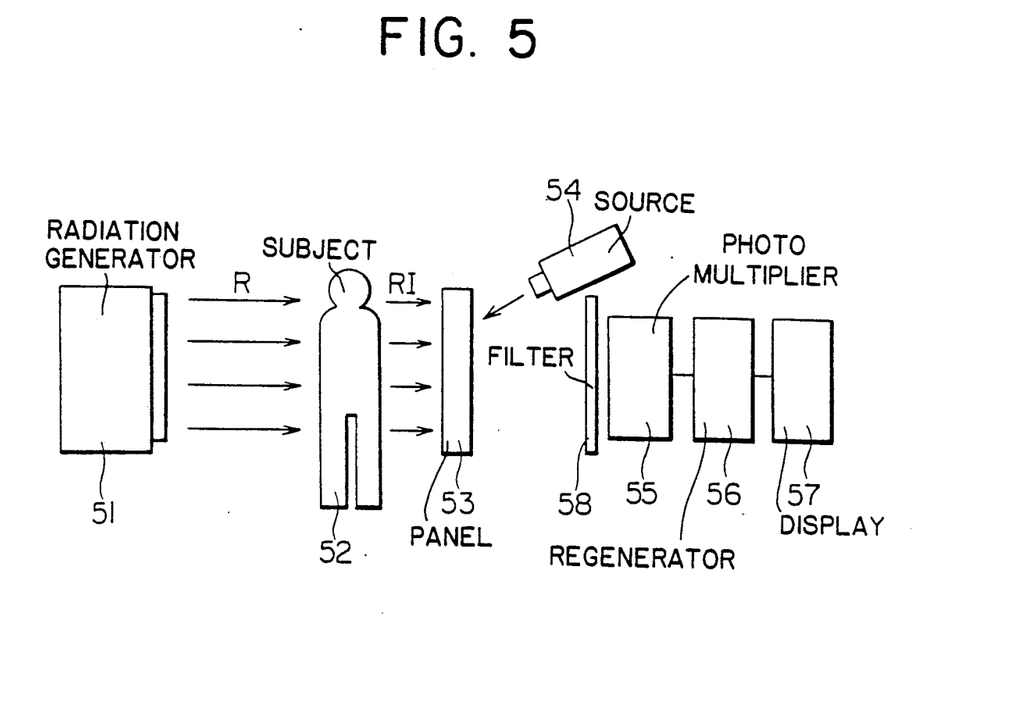
FIG. 5 is a schematic drawing of the radiographic image storage method used in the invention.

The radiographic image storage panel of the invention provides very good sharpness, graininess and sensitivity when used by the radiographic image storage method roughly illustrated in FIG. 5. In FIG. 5, 51 is a radiation generating device ; 52 is a subject ; 53 is a radiographic image storage panel of the invention ; 54 is a source of stimulable excitation rays ; 55 is a photoelectric conversion device which detects the stimulable fluorescence emitted from said panel 53 ; 56 is a device which regenerates detected signals as an image ; 57 is a displaying device which displays said regenerated image ; and 58 is a screen which separates stimulable fluorescence from stimulable excitation rays, and transmits the only stimulable fluorescence. Any of 53 to 55 is not limited to the above description so long as it serves to regenerate the optical information as any form.

As shown in FIG. 5, radioactive rays generated by the radiation generating device 51 is transmitted by the subject 52, and thrown into the radiographic image storage panel 53. The thrown radioactive rays are absorbed by the layer containing a stimulable phosphor of said panel 53, and their energy is accumulated therein, resulting in the formation of an accumulative image of radiation transmission. Subsequently, the stimulable fluorescence is emitted by exciting this accumulative image by stimulable excitation rays from the source 54. Since the layer containing a stimulable phosphor does not contain binder, and so has highly directivity, any diffusion of the stimulable excitation rays in the layer containing a stimulable phosphor on scanning said layer with said rays is suppressed.

Since the intensity of the emitted stimulable fluorescence is proportional to the quantity of the accumulated radiation energy, the radiation transmission image of the subject 52 can be observed by photoelectrically converting the optical signals using the device 55 such as a photomultiplying tube, and by regenerating as an image using the device 56 and displaying using the device 57.

Figure 6A:
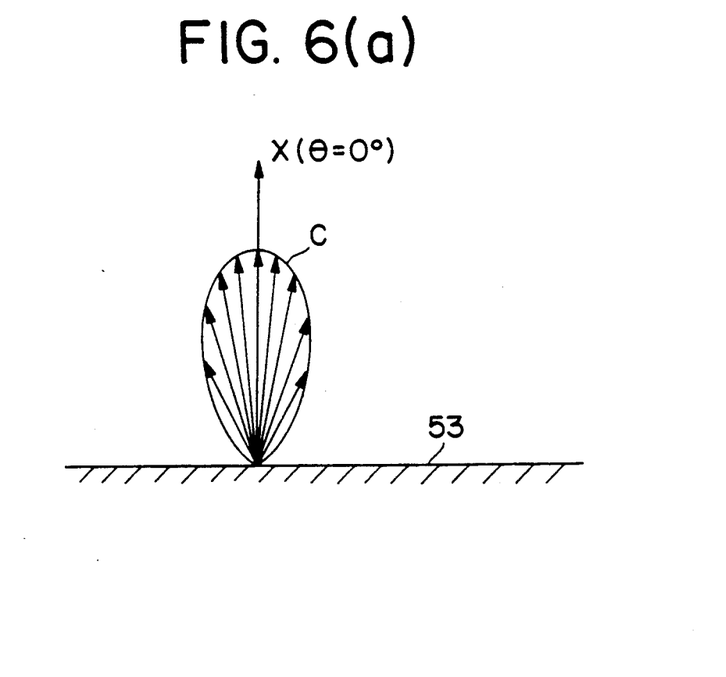
FIGS. 6(a) and (b) illustrate the angle-dependence of the stimulable fluorescence emission intensity of a radiographic image-conversion panel to be used in the invention.
Figure 6B:
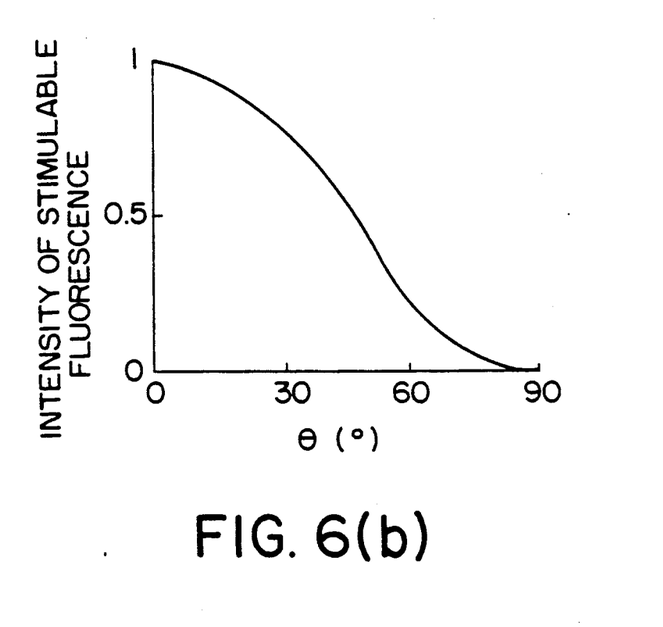

Referring to the condensation of the stimulated fluorescence emitted from a panel of the invention, FIG. 6 illustrates the angle-dependence of the intensity of the stimulated fluorescence emitted from a panel used in the invention, wherein X indicates a normal line direction and the arrows circled by the curved line C indicate the intensity of the stimulated fluorescence emitted at an angle $\theta$.

As is obvious from FIG. 6, the panels not containing any binder in the stimulable phosphor layer thereof used in the invention are remarkably greater in the angle-dependence of a stimulated fluorescence emission intensity than the panels used in the conventional processes. To be more concrete, the stimulated fluorescence emitted from a panel used in the invention is not completely diffused but is substantially greater in directivity to the normal line direction of a panel. In the panels of the invention, the stimulated fluorescence therefrom can effectively be condensed by locating the condensing plane of the stimulated fluorescence so as to be at a substantially right angle to the normal line direction of the panel.

Figure 7:
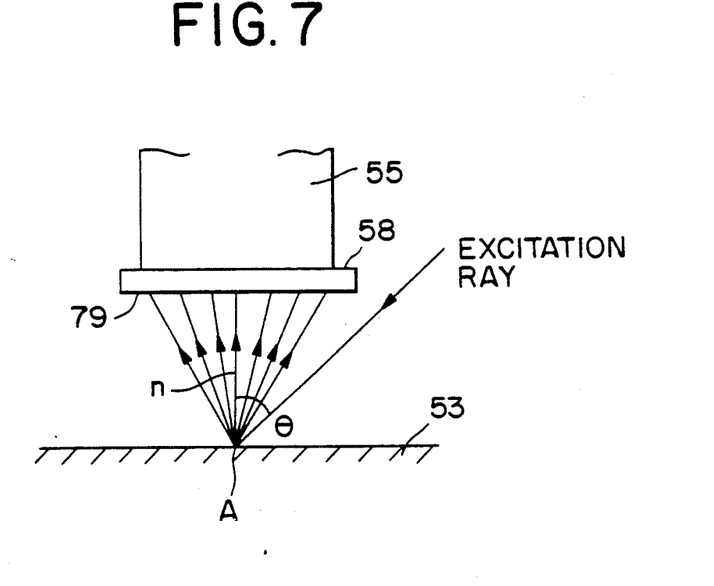
FIG. 7 illustrates the structure of a stimulated fluorescence detector applied to an image reading out process of the invention.

FIG. 7 is a diagram showing an example of the stimulated fluorescence detectors used in an image reading out process of the invention, wherein the reference numeral 53 is the above-mentioned panel; 58 is a filter for subtracting only the stimulated fluorescence portions among the light emitted from the panel; 55 is a photoelectric conversion device for converting the received fluorescence passed through the filter 58 into an electric signal, and this photoelectric conversion device 55 comprises the aforementioned photoelectric conversion elements in combination; 79 is a condensing plane which corresponds to the surface of the filter 58, and the condensing plane 79 is so arranged as to be at a substantially right angle to the normal line n of the panel 53. The operations of such an apparatus constructed as above will now be described below:

When an incident stimulable excitation light beam irradiates point A on the surface of a panel 53, at an angle $\theta$ to the normal line of the panel 53, a stimulated fluorescence is emitted from around point A, as shown in the drawing. This stimulated fluorescence is made incident upon a condensing plane 79. This condensing plane is the surface of a filter. Therefore, out of the incident rays of light, the reflected ones of the stimulable excitation light beams are stopped and only the stimulated fluorescence passes through the filter 58. The stimulated fluorescence passed through the filter 58 is converted into an electric signal by a photoelectric conversion device 55, and then an image processing and an image rearranged by a processing device (not shown).

Figure 8:
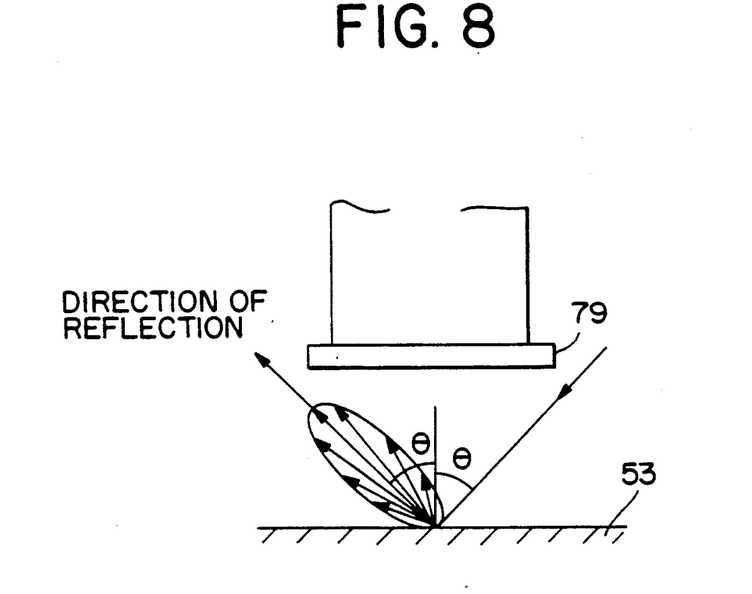
FIG. 8 is a diagram showing the reflective scattering property of the stimulated fluorescence emitted from the panel embodied in an example of the invention.

In the above-mentioned case, the stimulated fluorescence intensity is endowed with such an angle-dependence as shown in FIG. 6. Namely, the elements oriented in the normal line direction ($\theta = 0°$) are of the strongest stimulated fluorescence intensity. It is further confirmed that the reflected light of the stimulable excitation light beams subsides rapidly in light intensity, as the reflection angle $\theta$ is maximized and then shifted further, as shown in FIG. 8. If the reflected light is made incident upon the condensing plane, the reflected light and the stimulated fluorescence are hardly be separated. It is, therefore, better to widen the reflection angle $\theta$, that is, the reflection angle $\theta$ of a stimulable excitation light beam. The above-mentioned reflected light depends greatly upon the surface flatness of a panel, and therefore, the better the flatness is, the more the angle-dependence is. From the viewpoint of improving an image graininess, it is preferred generally to make a flatness better. If it is the case, the angle-dependence of reflected light will greatly be increased. An incident angle $\theta$ may suitably be within the range of from 30° to 60°, because, as the incident angle $\theta$ of a stimulable excitation light beam is widened, the diameter of an irradiating beam is hard to make smaller, and the surface reflection of a light beam is so increased as to lower the excitation efficiency.

According to the embodiment illustrated in FIG. 8, a stimulated fluorescence may most effectively be detected per unit area of light condensation on the condensating plane 79 and the stimulated fluorescence may also readily be separated from the reflected light of a stimulable excitation light beam, because the reflected light of the beam is not made incident directly upon the condensing plane. Further, such an advantage as an excellent efficiency of utilizing stimulable excitation light beams may be enjoyed, because nothing interferes the stimulable excitation light beams.

Figure 9:
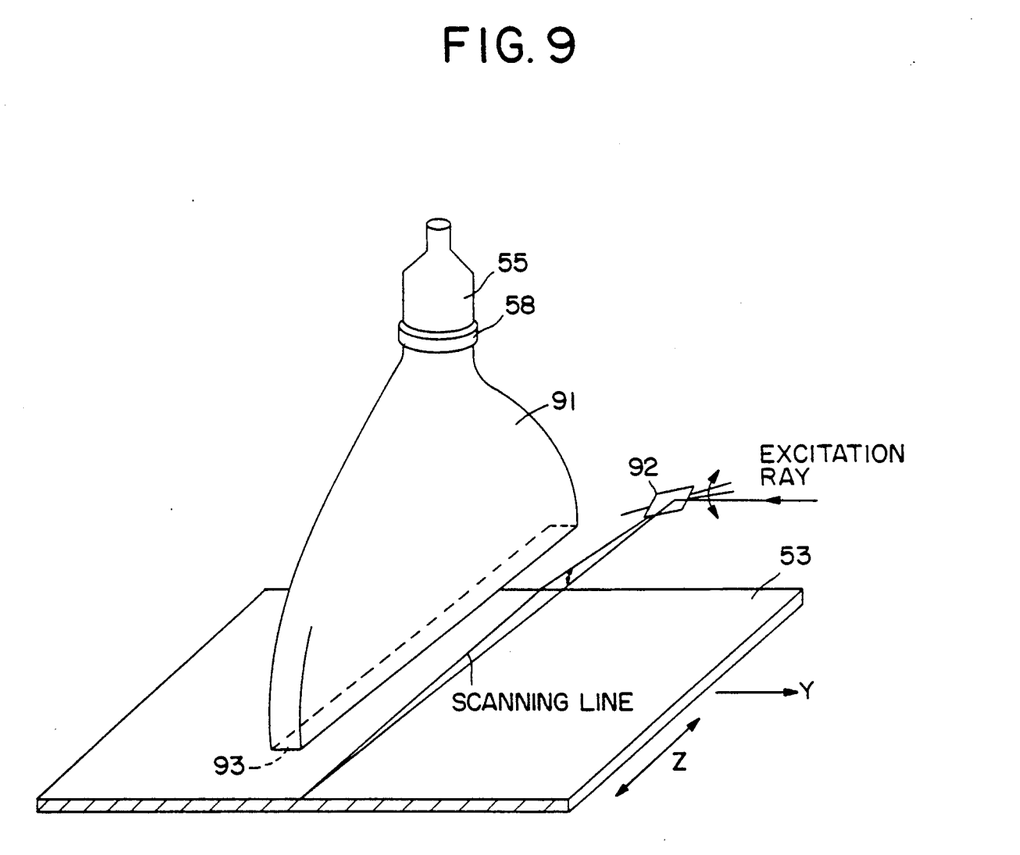
FIG. 9 illustrates an example of the means used for embodying an image reading out process of the invention.

FIG. 9 is a structural illustration of an example of the devices capable of being used in the processes of the invention for reading out a radiographic image, wherein the same parts as those shown in FIG. 7 are given the same reference numerals. In FIG. 7, a stimulated fluorescence emitted from the panel 53 are taken directly into a photoelectric conversion device 55, while in FIG. 9 the stimulated fluorescence is introduced into the photoelectric conversion device 55 through a photoconductor 91, that is a difference between the two. Reverting to FIG. 9, reference numeral 92 is a deflecting mirror for deflecting an incident stimulable excitation light beam to the principal scanning direction, (i.e., to the direction of Z, in FIG. 9). The operations of such a device as above will be described below:

A stimulable excitation light beam irradiates a panel 53 in the principal scanning direction, (i.e., in the direction of Z, in FIG. 9) while the beam is deflected by deflecting mirror 92 and with a given gradient to the normal line direction of the panel 53. The panel 53 irradiated with the stimulable excitation light beam emits a stimulated fluorescence which will then be introduced into a photoelectric conversion device 55 through a photoconductor 91. The condensing plane in this case is one of the sections 93 of the photoconductor 91 and is arranged by interposing the scanning beams between the panel 53 and the condensing plane so that the condensing plane may be in almost parallel with the panel 53. The length of the condensing plane in the scanning direction Z is so designed as to be the same as or longer than that of the panel 53, so that the detecting efficiency thereof may be protected from being lowered around the scanning area. Another section of the photoconductor 91 comes into close contact with one side of filter 58 and another side of the filter 58 comes into contact with the photoelectric conversion device 55 and, therefore, no loss of light caused. When using plastic fibers, for example, to serve as a photoconductor, the detecting efficiency may be improved. Such a photoconductor may be prepared by processing plastic sheets.

Advantages of the Invention

As in the invention described above, when taking the following steps:

A panel is provided on the surface thereof, with a stimulable phosphor layer not containing any binder;

And, in reading out the image information from the above panel, the incident direction of a stimulable excitation light is oriented at an angle with respect to the normal line of the panel;

The direction of the light reflected therefrom is shifted from the direction of the strongest stimulated fluorescence intensity, that is the normal line direction of the panel;

The stimulated fluorescence emitted is made utilizable in the normal line direction that is the most favorable direction;

Preferably, a stimulable phosphor layer of fine pillar-like block structure is formed; and Further, a laser beam is used to serve as the stimulable excitation light;

Then, the invention can enjoy the following advantages:

(1) Not only the sensitivity to radiation can highly be increased but also the S/N ratio of a radiographic image can be improved, because the efficiency of condensing stimulated fluorescence is remarkably high; and (2) Stimulable excitation light and stimulated fluorescence are excellently separable from each other and the S/N ratio of a radiographic image can be improved.

EXAMPLES

The invention is described on the basis of its examples as follows:

EXAMPLE 1

First, 300 μm-thick black polyethylene terephthalate film as a support is placed in a vacuum evaporating apparatus. Alkaline halide stimulable phosphor (0.9RbBr.0.1CsF:0.01Tl) is placed in a tungsten boat for resistive heating, which is then set to a couple of electrodes for resistive heating. Subsequently, the vacuum evaporating apparatus is evacuated to $2 \times 10^{31\ 6}$ Torr.

Next, by charging the tungsten boat with electricity, the alkaline halide stimulable phosphor is vaporized until the thickness of a stimulable phosphor layer formed on the polyethylene terephthalate film reaches 300 μm to obtain a radiographic image storage panel A of the invention.

The obtained radiographic image storage panel A is irradiated by 10 m R of X-rays from a lamp voltage of 80 KVp, and subsequently stimulably excited by He-Ne laser beam of 633 nm. The stimulable fluorescence emitted by the layer containing the stimulable phosphor is photoelectrically converted by a light detector is photomultiplying tube, and the obtained signals are regenerated as an image using an image regenerated and recorded on a silver salt film. The sensitivity of the radiographic image storage panel A to X-rays is examined with the size of signal, and the modulation transfer function (MTF) and the graininess of the image are examined for the obtained image. The results are shown in Table 1.

In Table 1, the sensitivity to X-rays is represented by a relative index against 100 for the radiographic image storage panel A of the invention. The MTF is referred to the value at a spatial frequency of 2 cycles per mm. The graininess is evaluated as good, moderate and poor, respectively.

EXAMPLE 2

Procedures of Example 1 are repeated, except for, instead of 300 μm, 150 μm of the thickness of said layer, to obtain the radiographic image storage panel B of the invention.

The obtained radiographic image storage panel B is evaluated in the same way as in Example 1. The results are shown in Table 1.

EXAMPLE 3

Procedures of Example 1 are repeated, except for using, instead of the film of Example 1 as a support, black polyethylene terephthalate film whose surface is provided with a jagged pattern, to obtain the radiographic image storage panel C of the invention.

The jagged pattern is constituted by the alternation of grid-like 10 μm-wide and 100 μm - high projecting parts, and 100 μm-by-100 μm depressed parts.

The obtained radiographic image storage panel C is evaluated in the same way as in Example 1. The results are shown in Table 1.

EXAMPLE 4

Procedures of Example 1 are repeated to obtain the radiographic image storage panel D of the invention. By the only exception, however, a separated tile-pattern structure is used instead of the film of Example 1 as support. This structure is made by first treating the surface of a 0.5 mm-thick aluminum sheet with anode oxidation, and treating the sheet to seal holes. Then the aluminum sheet is heat-treated over 200° C. to generate a number of cracks throughout the aluminum oxide layer. Thus the structure having a number of tile-like small chips separated one another by said cracks throughout its surface is obtained as a support.

The obtained radiographic image storage panel D is evaluated in the same way as in Example 1. The results are shown in Table 1.

Control 1

Eight (8) wt. parts of alkaline halide stimulable phosphor (0.9RbBr0.1CsF:0.01Tl) and 1 wt. part of polyvinyl butyral resin are added to and dispersed into 5 wt. parts of cyclohexanone. This dispersion is evenly applied onto a 300 μμm-thick black polyethylene terephthalate film horizontally held as a support, and air-dried to form a 300 μm-thick layer containing the stimulable phosphor, The obtained radiographic image storage panel as the control P is evaluated in the same way as in Example 1. The result are shown in Table 1.

Control 2

Procedures of Control 2 are repeated, except for, instead of 300 μm, 150 μm of the thickness of the layer containing the stimulable phosphor.

The obtained radiographic image storage panel as the control Q is evaluated in the same way as in Example 1. The results are shown in Table 1.

TABLE 1

| Panel | Layer thick., μm | Sensitivity to X-rays | Graininess | Sharpness, % |
|---|---|---|---|---|
| (Example) | | | | |
| A | 300 | 100 | good | 37 |
| B | 150 | 51 | moderate | 45 |
| C | 300 | 94 | good | 45 |
| D | 300 | 95 | good | 47 |
| (Control) | | | | |
| P | 300 | 50 | moderate | 30 |
| Q | 150 | 24 | poor | 40 |

As seen in Table 1, the radiographic image storage panels A to D have roughly twice the sensitivity to X-rays, and have better image graininess compared to the respective Controls P and Q being the same in thickness of the layer containing a stimulable phosphor. These results are on account of that the layer containing a stimulable phosphor of the radiographic image storage panel of the invention is higher in packing ratio and better in absorption rate of X-rays compared to that of the control panel because of the absence of binder in the former layer.

In addition, although the radiographic image storage panels A to D are higher in sensitivity to X-rays as above, they are also better in image sharpness compared to Control P and Q, respectively.

These results are on account of the reduced dispersing of the stimulably exciting He-Ne laser beam in the layer containing a stimulable phosphor of the radiographic image storage panel of the invention because of the high directivity of said layer due to the absence of binder therein.

Especially in the radiographic image storage panels C and D of the invention, their supports are particularly devised. As a result, the layer containing a stimulable phosphor of panel C is finely divided into minute projecting and depressed parts; that layer of panel D is finely divided by the effect of a number of fine cracks provided on the surface of its support. Consequently, it becomes possible to further reduce dispersing of the stimulable excitation rays in the layer containing a stimulable phosphor, resulting in the further improvement of the image sharpness.

EXAMPLE 5

As a support, 300 μm-thick black polyethylene terephthalate film is placed in a sputtering apparatus. Then as a target of sputtering, alkaline halide stimulable phosphor (0.95 RbBr 0.05 CsF: 0.005 Tl) is placed in the sputtering apparatus, and subsequently the apparatus is evacuated to $1 \times 10^{-6}$ Torr. Sputtering is conducted while introducing Ar gas as a sputter gas, until the thickness of the layer containing the stimulable phosphor depositing on said polyethylene terephthalate film reaches 300 μm to obtain the radiographic image storage panel E of the invention.

The obtained panel E is evaluated in the same way as in Example 1. The results are shown in Table 2.

TABLE 2

| Panel | Layer thick., μm | Sensitivity to X-rays | Graininess | Sharpness, % |
|---|---|---|---|---|
| E | 300 | 100 | good | 36 |

As seen in Table 2, the radiographic image storage panel E by sputtering exhibits good sensitivity to X-rays, graininess as well as sharpness, similarly to panels A to D by vacuum sputtering.

What is claimed is:

1. A process for reading out a radiographic image of remarkable sharpness comprising 1) irradiating a radiographic image storage panel having a layer, formed by vacuum evaporation and containing a stimulable alkali halide binderless phosphor, with an excitation ray at an oblique incident angle to a line normal to said panel, said phosphor comprising a pile-like structure, said alkali halide being of the formula $$M^I X . a M^{II} X_2^I . b M^{III} X_3^{II} . c A$$

wherein $M^I$ is at least one alkali metal selected from the group consisting of Li, Na, K, Rb and Cs; $M^{II}$ is at least one divalent metal selected from the group consisting of Be, Mg, Ca, Sr, Ba, Zn, Cd, Cu and Ni; $M^{III}$ is at least one trivalent metal selected from the group consisting of Sc, Y, La, Ce, Pr, Nd, Pm, Sm, Eu, Gd, Tb, Dy, Ho, Er, Tm, Yb, Lu, Al, Ga and In; each X, $X^I$ and $X^{II}$ is at least one halogen selected from the group consisting of F, Cl, Br and I; A is at least one metal selected from the group consisting of Eu, Tb, Ce, Tm, Dy, Pr, Ho, Nb, Yb, Er, Gd, Lu, Sm, Y, Tl, Na, Ag, Cu and Mg; and a and b are each 0 to 0.5 and c is 0 to 0.2, and 2) placing a condensing plane of stimulable fluorescence from said panel perpendicular to said normal line.

2. The process of claim 1, wherein said oblique angle is 30° to 60°.

3. The process of claim 1 wherein said layer is 30 μm to 1000 μm thick.

4. The process of claim 3 wherein said layer is 50 μm to 800 μm thick.

5. The process of claim 1 wherein said panel includes a support having a matte surface.

* * * * *